(12) United States Patent
Ayala De Llano et al.

(10) Patent No.: US 12,296,787 B2
(45) Date of Patent: May 13, 2025

(54) CHILD ASSISTANCE FOR DRIVERS

(71) Applicant: FORD GLOBAL TECHNOLOGIES, LLC, Dearborn, MI (US)

(72) Inventors: Adriana Ayala De Llano, Mexico City (MX); Miguel Alfonso Aguilera, Naucalpan (MX); Eduardo Canamar Velarde, Naucalpan (MX); Gerardo Moya, Mexico City (MX)

(73) Assignee: Ford Global Technologies, LLC, Dearborn, MI (US)

( * ) Notice: Subject to any disclaimer, the term of this patent is extended or adjusted under 35 U.S.C. 154(b) by 151 days.

(21) Appl. No.: 17/952,745

(22) Filed: Sep. 26, 2022

(65) Prior Publication Data

US 2024/0101065 A1 Mar. 28, 2024

(51) Int. Cl.
*B60R 22/48* (2006.01)
*G06V 20/59* (2022.01)

(52) U.S. Cl.
CPC .............. *B60R 22/48* (2013.01); *G06V 20/59* (2022.01); *B60R 2022/4808* (2013.01); *B60R 2022/4866* (2013.01)

(58) Field of Classification Search
None
See application file for complete search history.

(56) References Cited

U.S. PATENT DOCUMENTS

| | | | |
|---|---|---|---|
| 8,044,782 B2* | 10/2011 | Saban | B60N 2/002 340/439 |
| 9,014,920 B1* | 4/2015 | Torres | G08B 21/0202 701/45 |
| 2012/0242476 A1 | 9/2012 | Schoenberg et al. | |
| 2014/0309806 A1 | 10/2014 | Ricci | |
| 2018/0144369 A1* | 5/2018 | Pouliot | B60W 30/0953 |
| 2023/0356729 A1* | 11/2023 | Gu | G06V 20/59 |

FOREIGN PATENT DOCUMENTS

| CN | 209218135 U | 8/2019 |
|---|---|---|
| CN | 110356347 A | 10/2019 |

* cited by examiner

*Primary Examiner* — K. Wong
(74) *Attorney, Agent, or Firm* — Joseph Zane; Brooks Kushman P.C.

(57) ABSTRACT

A vehicle receives a user-input correlation between a plurality of predefined messages and a plurality of predefined behavioral situations defining child behavior. The vehicle determines the presence of at least one child within the vehicle based on vehicle sensor data. Also, the vehicle determines, based on vehicle systems, that one of the predefined behavioral situations is occurring with regards to the at least one child and selects, based on the user-input correlation, at least one message associated with the determined occurrence of the behavioral situation. The vehicle automatically outputs the at least one message through a vehicle output.

20 Claims, 3 Drawing Sheets

CHILD ASSISTANCE FOR DRIVERS

TECHNICAL FIELD

The illustrative embodiments relate to methods and apparatuses for child assistance for drivers.

BACKGROUND

As anyone who has driven with active children in a vehicle knows, even a single child can create a great deal of disturbance, whether due to good or bad behavior. Children often talk to parents while driving, ask requests of parents, cry, fight and generally engage in behavior that can have an effect on a parent's ability to watch the road.

Parents often do not want to scold a child or yell at a child, but such reactions often produce the swiftest results, and so may be a fallback for a parent who is attempting to watch the road in heavy traffic at speed. There is a belief that positive reinforcement yields more positive results, however, but such reinforcement typically requires more of the parent's focus.

For similar reasons, when a child is behaving well, it is easy to forget to offer encouragement for such behavior to reinforce such behavior, which may lead the child to learn that the fastest way to get a response is to misbehave. Sometimes, children in a vehicle will do this simply because they are bored and desire interaction.

SUMMARY

In a first illustrative embodiment, a vehicle includes one or more processors configured to determine an identity of an occupant for which a customized vehicle message is designated. The one or more processors are further configured to determine the occurrence of a predefined situation with respect to the occupant and select the customized message from an occupant profile responsive to the occurrence of the predefined situation. Also, the one or more processors are configured to select at least one vehicle output associated with a determined location of the occupant and automatically output the customized message through the selected vehicle output.

In a second illustrative embodiment, a vehicle includes one or more processors configured to receive a user-input correlation between a plurality of predefined messages and a plurality of predefined behavioral situations defining child behavior. The one or more processors are further configured to determine the presence of at least one child within the vehicle based on vehicle sensor data. Also, the one or more processors are configured to determine, based on vehicle systems, that one of the predefined behavioral situations is occurring with regards to the at least one child and select, based on the user-input correlation, at least one message associated with the determined occurrence of the behavioral situation. The one or more processors are additionally configured to automatically output the at least one message through a vehicle output.

In a third illustrative embodiment, a method includes determining that a child is behaving in a manner correlated to a predefined behavioral state of a plurality of behavioral states, based on vehicle sensor data indicating behavioral actions of the child corresponding to predefined action parameters associated with a respective predefined behavioral state. The method also includes determining a predefined message designated for playback responsive to the determined predefined behavioral state. Further, the method includes outputting the predefined message, responsive to determining the predefined behavioral state, through an output associated with an observed location of the child within a vehicle. The method additionally includes determining a change to the behavioral actions of the child resulting in a loss of correspondence to the predefined action parameters associated with the determined behavioral state, responsive to output of the predefined message and outputting a second predefined message designated for playback responsive to a change in behavioral actions of the child resulting in the loss of correspondence.

DETAILED DESCRIPTION

Figure 1:
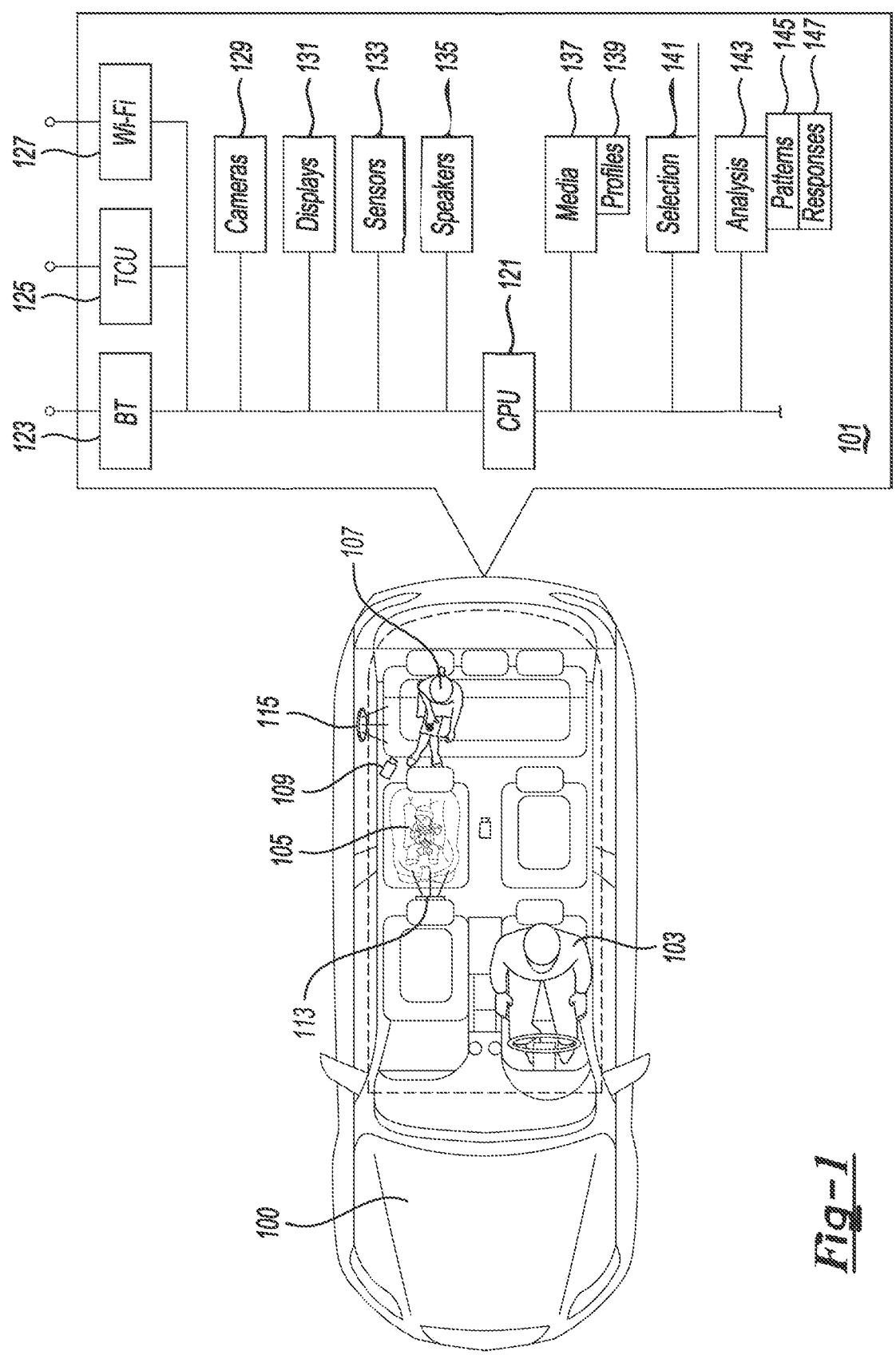
FIG. 1 shows an illustrative example of a vehicle 100.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

Vehicles include interactive displays, advanced sound systems, and onboard sensor suites and analysis capabilities that can aid a parent in helping change a child's behavior, or reinforce good behavior. Modern vehicle alert and reminder systems can often be repetitive and mechanical, by design, which may work well for reminding an adult to buckle a seat-belt, for example, but which a child may ignore or even become irritated by. It is also possible that a child will not make a connection between a beeping sound and a request to buckle a seat belt, thus requiring a parent to turn around and issue a reminder.

Advanced vehicle sensors, infotainment systems and outputs can assist a parent in many regards with respect to management of children. While not serving as a proxy for a parent, these systems have a capability to utilize funny voices, favorite sounds, or even a recorded parent's or relative's voice to issue reminders, positive reinforcement, etc. Generalized analysis can help reveal when a child is fidgeting or fussing, or even when a child is helpful, such as reaching over to assist a sibling in buckling. Positive reinforcement, which can be married with in-vehicle or other rewards, can encourage proper behavior with minimal effort on the part of a parent who would prefer to be driving.

FIG. 1 shows an illustrative example of a vehicle 100, which includes a driver occupant 103, an infant occupant 105, and a child occupant 107. Vehicle 100 includes one or more cameras 109 having views of the rear interior of the vehicle, especially in regions out of direct eyeshot of a parent 103 who is watching the road. The vehicle may also include visual outputs 113, such as screens, and audio outputs 115 adjacent to one or more seating areas.

The vehicle 100 may further include a computing system 101 that includes communication transceivers such as BLUETOOTH 123, a telematics control unit (TCU) providing cellular communication 125, a Wi-Fi transceiver 127, etc. These communication mediums, in the context of the illustrative embodiments, can be used to obtain media content, manage reward accounts, etc. Long range communication may also be used to obtain live assistance off-board a vehicle, such as a grandparent or non-driving parent using a video chat to directly provide live feedback to children when a parent needs to watch the road.

The computing system may include one or more processors 123 which can control onboard cameras 129, which can be used to identify (specifically or demographically) rear occupants to determine, for example, if they are known parties and/or correspond to children or younger age adults who may respond better to alternative reminders and vehicle interactions.

One or more vehicle displays 131 may also be included, which can include a center stack display viewable by a driver and one or more rear displays viewable by occupants in the rear of the vehicle. The vehicle may also include sensors 133, such as sound sensors and weight sensors, which can respectively provide audio feedback for analysis and identify where rear occupants are located based on weight sensing. Speakers 135 and other audio output may be located about a rear cabin, and can be controlled selectively by the processor to direct feedback to a specific location or locations. This can allow multiple different passengers to receive different reminders in different preferred formats at the same time. This could be useful if a baby is being soothed by playback from a favorite cartoon character while an older child is being reminded to buckle a seat belt by a favorite movie character. Correct permissioning for use of various trademarked voices and images can be obtained, and many creators of such media may be happy to participate in such programs as it creates further linkage to their characters and generally promotes positive messaging.

The vehicle 100 may include a media repository 137, which may store, for example, select audio and video clips from a variety of characters. This can include self-generated content, i.e., Grandma issuing gentle reminders or positive messages, as well as entertainment figures issuing comparable statements. Speech modeling may also be used to dynamically craft messages that approximate the voices of certain characters, for custom messaging. Rewards, as discussed later, may include unlocking new phrases that a child can apply—a phrase that used to state "buckle your seatbelt please" may be replaced with "engage restraints, the spaceship is about to blast off" when the child has successfully complied sufficient times and has earned the reward of choosing a replacement phrase.

Individual preferences for identifiable occupants can be stored 139 in conjunction with the media files, to correlate media to a particular occupant. When there is no reasonable way to identify occupants, children may rotate priority in media playback selection or parents can correlate certain media files to certain seating locations if the children tend to sit in the same location repetitively, which is often the case until later ages, due to modern booster seat recommendations and the hassle of moving booster seats around within a vehicle.

The computing system may also include one or more selection processes, which can include the capability for parents to define preferred responses to observed behavior, including customized auto-response buttons for swiftly choosing a reaction while driving. This may also include capability for a child with a tablet or a phone to interact with a display or settings, with permissions, to change outputs.

Again, some the ability to do this could come as part of a reward for prior good behavior.

One or more analysis processes 143 could analyze child behavior and attempt to automatically select a response in accordance with settings, or categorize preferred responses for parent selection. These processes can record both patterns of behavior of child-occupants at 145 as well as track what sorts of responses occur in reaction to different in-vehicle messaging at 147. Some children might respond better to a change in attention focus, others may respond better to a kind message, still others may respond best to a reward-based schema. Once there is sufficient data in behavior patterns and response success, it may be easier for an AI program onboard the vehicle to automatically choose a reasonable type of response to an observed type of behavior.

Figure 2:
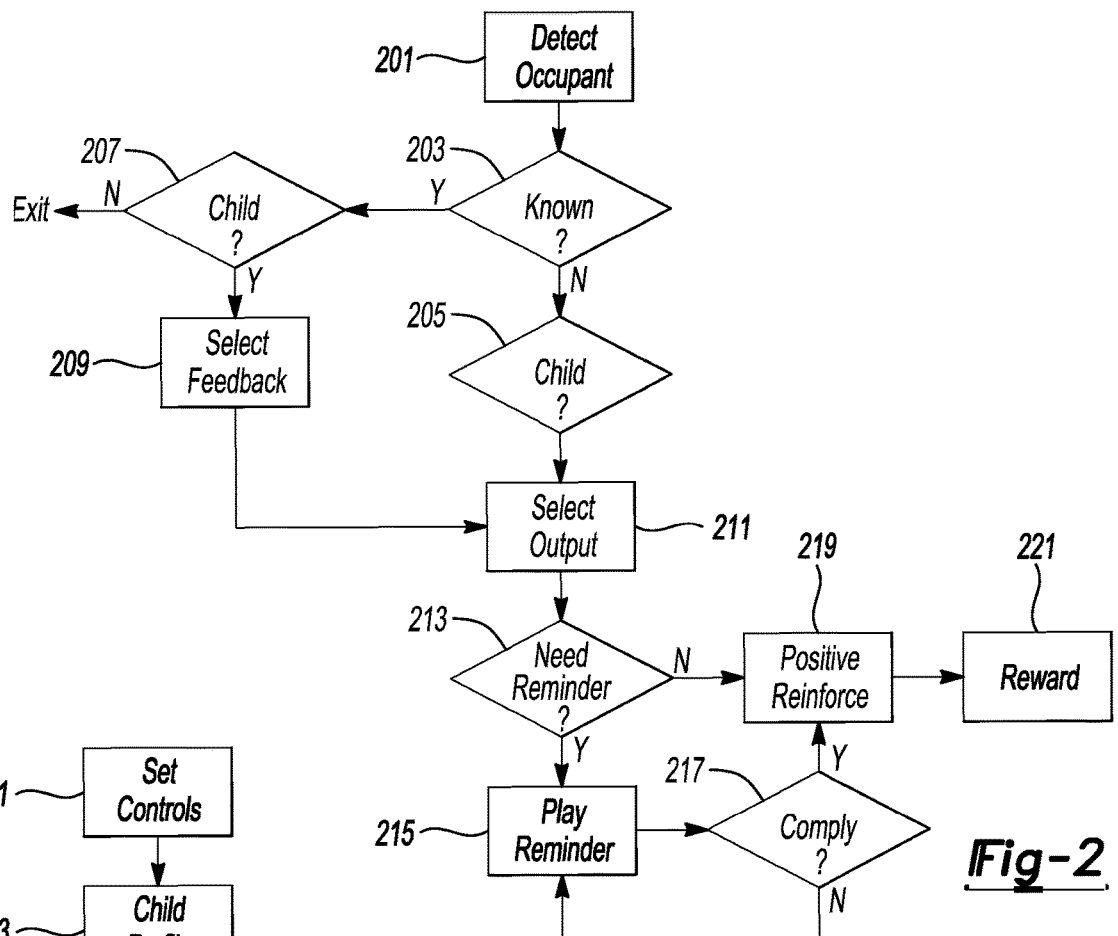
FIG. 2 shows an illustrative example of an occupant analysis and response process.

FIG. 2 shows an illustrative example of an occupant analysis and response process. In this example, the process uses one or more onboard sensors to detect an occupant at 201. This can include visual detection through a camera, audio detection through a general or specifically positioned microphone, weight sensing, etc.

The process attempts to determine if the occupant is known at 203. With cameras, visual recognition processes can identify a specific child when sufficient data is provided for comparison. Audio speech recognition may also be able to identify a childe based on tone, speech patterns, etc. In most vehicles, the occupancy rarely exceeds a group of seven or eight common occupants, and it may often be more in the range of three to four, which makes a limited sorting process effective even if it does not utilize highly sophisticated matching. For example, if two parents, a 70 lb boy and an 20 lb girl commonly occupy a vehicle, many basic algorithms can identify who is who, at least with respect to the children, by simply looking at a head shape or size, measuring weight, looking at an apparent height, checking audio against four voice profiles, etc.

Occupant profiles may even be portable, so the experience could continue in a rental vehicle with limited sensing for similar reasons, provided that the vehicle had access to the limited data set representing likely occupants. Even when classification of specific parties is not possible, a conclusion of a child vs. an adult based on a sensed weight of, for example, 35 lbs, is frequently going to be correct. And in instances where a family member is differently-sized, such as a low-weight adult or a heavier child, the subset will again likely be small enough that an error may only occur once, if a generalization is made, before accurate data about the limited subset is obtained. With children of comparable weights and heights, hair length, hair color, etc., if viewed through a camera, can prove as useful sorts among the group.

If the occupant is specifically known at 203, the process can determine if the occupant is also a child at 207. While techniques provided herein can be used with occupants of any age, the examples are directed to application to child-occupants, although the concepts are not so-limited. If the occupant is a specifically identifiable child at 207, the process can select preferred feedback associated with that child at 209, which can include specific data stored in a media repository 137. The media repository may also be part of an online profile or a profile stored on a portable device, and the vehicle may have access to the repository through communication with a server or the portable device.

When the occupant is not specifically known, but is known to be a child at 205, the process may select a more generalized output sequence that may include positive and/or soothing messages instead of vehicle sounds for reminders and alerts. This can also include custom sounds, for example, if a parent only has one child and lacks a vehicle that can identify the child specifically, the vehicle may assume that the present child is the same child each time, and a parent can configure a feedback profile for "child" to be used whenever a child is present, since that will typically be the same child.

The process may also select one or more outputs at 211, which can include outputs localized around a child location in the vehicle, determinable through seat sensors, camera sensors, seat-belt sensors, which doors were used for access, etc.

A need for reminders, most commonly seatbelt reminders, can be determined at 213. This can also include reminders about not touching window or door controls if the child is playing with those controls, or reminders or feedback related to observed behavior of the child at any point in a journey. In this example, if the reminder is not needed because the child already buckled, or did not play with the controls, or is generally behaving in a positive and helpful manner at 213, the process can issue positive reinforcement at 219. This can include positive messaging such as "thank you for buckling your seatbelt," "good job not touching the window control," "thank you for being so quiet/nice/etc."

If a reminder is needed, based on a common reminder or observed behavior at 213, the process can play a reminder correlated to the situation. This can be a generalized reminder such as "remember, daddy is driving and would be really happy if you were helpful and nice," or a more specific reminder such as "please do not play with that button," or "please do not yell while mommy is driving, please use a nice voice." Such messaging, especially if delivered in a voice matching a favorite character or relative, or in some instances, delivered directly from a video of the character or relative, can encourage positive behavior, as children may want to please the beloved character by accommodating the request.

If the child behaves as requested at 217, the process may then also provide positive reinforcement as mentioned above at 219, otherwise the same or a different reminder may be played at 215, provided a parent wants the reminders to be continual.

This example also includes a rewards system, that can provide a digital reward to a well behaved child at 221. This can include, for example, providing direct control over in-vehicle media to that child for a limited time period, so that child can select a next-song, for example, or providing digital stickers, points, stars, etc. to a child profile. If the child has an application working in concert with the vehicle, on a mobile device such as a phone or tablet, many reward possibilities can be enabled through digital controls. This can include an ability to change a message or even unlock a new message or character for messaging. Digital stickers can be applied to vehicle displays or device displays, and a reward tracking system can track long-term good behavior for even better rewards. Since much of this interaction can be done with limited to no parental intervention, depending on the role a parent wants to play, this can provide an opportunity to have the vehicle help interact with the children in a positive manner while allowing the parent to watch the road and keep focus on driving.

Figure 3:
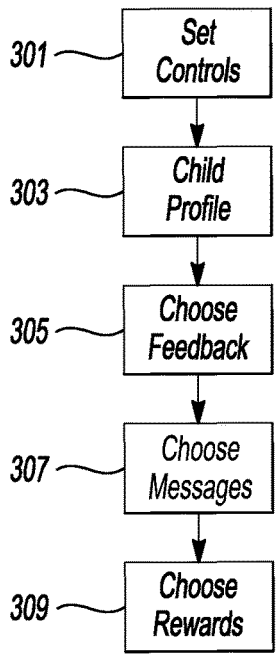
FIG. 3 shows an illustrative configuration process.

FIG. 3 shows an illustrative configuration process. This process, or a comparable process, allows a parent to set up a series of responses to child behavior and for use in general reminders. Since each child may prefer different characters and respond differently to varied approaches of reinforcement, the parent can configure profiles for general vehicle usage or for each child.

In this example, the parent enters a configuration mode at 301 and selects or creates a child profile at 303. This can include using in-vehicle imaging or sensing data to associate baseline child data with a child in a given profile. The vehicle may even be capable of updating this data over time, as a child grows. For example, if a vehicle identifies a child with a reasonable degree of accuracy and observes through sensors that the child has increased in weight, height, etc., the vehicle can update a baseline profile to improve the vehicle's ability to continually identify that child.

The parent or entity configuring the settings can choose one or more sources of feedback at 305. This can include selection of character voices to use, recording of messages, selection of messages from a connected device, live recording from an external source, etc.

In one example, a parent may have a subscription to a media outlet that allows for use of characters produced by that outlet, which can include both pre-recorded messages and/or speech profiles allowing for dynamic assembly of messages.

In another example, a parent may want their own voice to be used, and may directly record the messages themselves. Multiple forms of feedback can be used, and so, for example, the parent could choose a character for a first message and then record a message such as "mommy wants you to be sure to listen to Hoppy the Bunny" for use if the child does not respond to the first message in a timely manner. Children may also have multiple characters associated therewith to provide some variety in messaging through randomization.

In still another example, feedback from a grandparent or older sibling may be better received, for example. The parent can store pre-recorded messages on a mobile device and the vehicle can download these messages. Additionally or alternatively, the parent could place a phone call or video call to a desired party and have them record the messages live for storage with respect to a child profile.

The parent may also be able to select specific messages from a list of messages at 307. This can include selection of messages related to an event, as well as choosing tone and context if suitable variety is present. The parent can also sequence messages for reminder sequences, so that a reminder to take an action is not a simple constant repetition of the same message. This sequencing can bounce between characters, and can even include a group of messages about the same topic to be randomized for playback at each reminder instance, which avoids predictability but also avoids redundancy.

Finally, if rewards are enabled, the parent can choose or configure rewards at 309. The rewards possibilities are virtually endless, since a parent can also link real-world rewards to performance. In this example, however, the rewards can include, for illustration only, the use of digital stickers, selection of digital sticker sets, persistence of digital stickers, character unlock rewards, character phrase unlock rewards, ability to configure character reminders for certain actions, additions of media time if media time is controlled (this can include adding time to an external daily media usage tracker), the ability to directly control an infotainment system, the duration of direct control, actions to have rewards associated therewith, as well as varied reward schema for each action. It may even be possible to partner with third party applications and have rewards provided in the form of virtual currency in an unrelated application, such as a favorite game—e.g., five days in a row of buckling a seatbelt without reminder obtains 50 Happy Coins in the Life is Wonderful mobile phone game.

Figure 4:
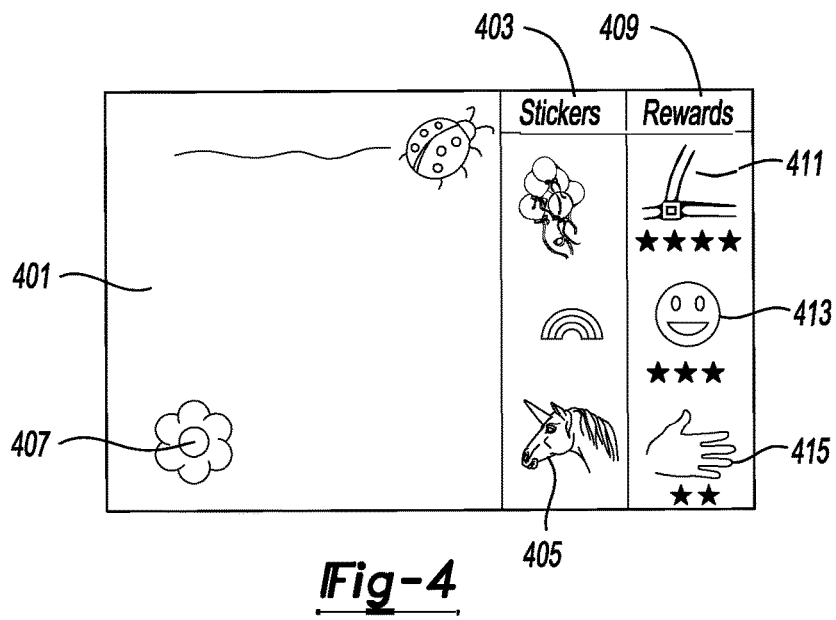
FIG. 4 shows an illustrative in-vehicle or device display for child interaction.

FIG. 4 shows an illustrative in-vehicle or device display for child interaction. This is a display that may be shown in-vehicle on a vehicle display and/or as part of an application on a child's mobile device, such as a phone or tablet. Not only does this display itself provide a form of entertainment that may reduce unwanted behavior, but it also allows a child to obtain, deploy and track digital rewards stemming from good behavior and expected behavior.

Display 401 may include a main portion, wherein media content may be viewed and/or messaging could appear. This can include feedback messaging or just general content interaction and viewing. Interactive menus 403 and 407 may also be provided. Menu 403 in this example shows a digital sticker collection. This can include permanent stickers, one-use stickers, re-usable stickers, duration-lapsed stickers, etc. Parents may be able to configure attributes of stickers 407 with regards to a given sticker or even with regards to a level of reward. For example, buckling a seatbelt earns a one-use sticker that disappears five days after deployment. Buckling a seatbelt five times in a row, or helping a sibling buckle twice, earns a permanent, reusable sticker. This sort of configuration can be used to increase incentive for behavior considered to be important to a given parent. Special fancier stickers, such as those with animation or sound, may also be available as rewards or advanced rewards. It may even be possible to unlock aspects of stickers or upgrade stickers (and/or any other reward).

The child can deploy the stickers at 407, which may include limited deployment to certain displays or display areas. For example, for very good behavior, a child may be able to deploy a single sticker to the center stack display in a manner where it will not interfere with applications on the display. This may be considered an important prize to children, since it affects a display that is associated with mom or dad. The flexibility of the rewards system is near endless, and the stickers are provided as a mere example of the endlessness.

The example display 401 also includes a behavior tracking process 409 that displays tracked good behavior for the child. In this example, stars represent successes, which are shown with regards to seatbelt buckling 411, happy or nice behavior 413, helpful behavior 415, etc. Since a vehicle may not always be able to discern when a child is being "nice" or "helpful," it may be incumbent on parents to identify some of this behavior at appropriate moments in a drive. A small persistent application, such as a window with a child's name displayed on a center stack, can allow for one-press application of a helpful or nice award with minimal focus from a parent. Subtraction of rewards is also contemplated.

Figure 5:
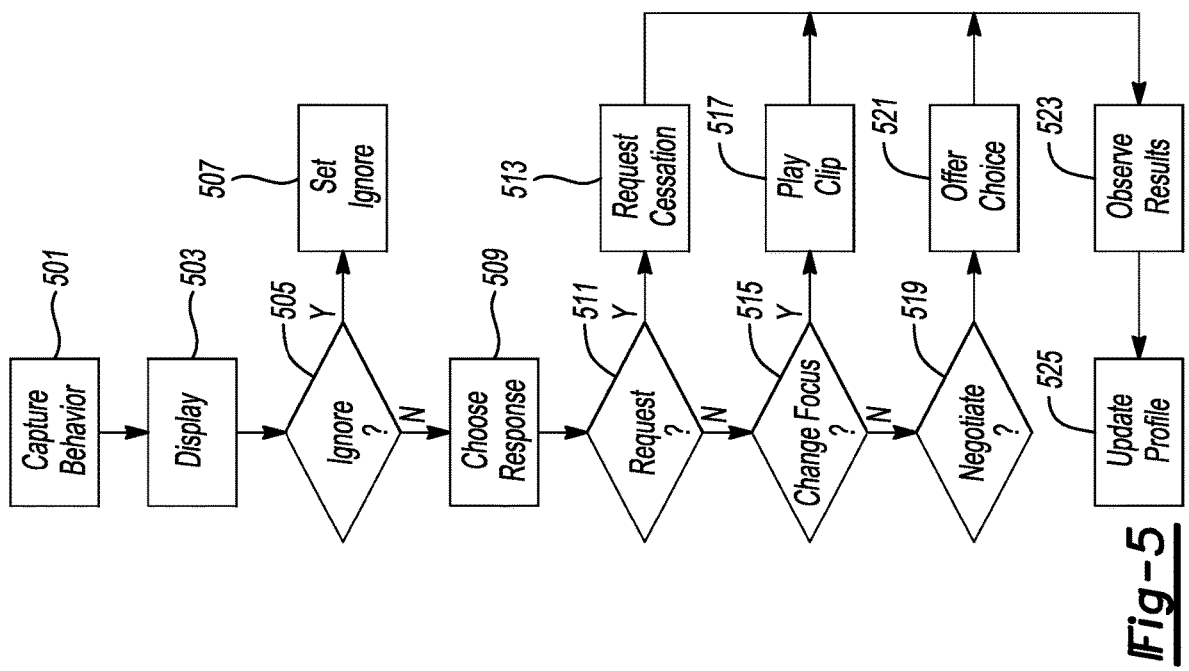
FIG. 5 shows an example of a behavior analysis process.

FIG. 5 shows an example of a behavior analysis process. At at least certain times, this process may require input from a parent, especially when modeling is first occurring if AI is to be eventually used to identify behavior. It may be useful to individually model children, even if generalized modeling is available, because what sounds like crying from one child could be laughter from another.

This process attempts to minimally involve the parent in the feedback process except when needed, to allow the parent to focus elsewhere. If any type of predetermined behavior is observed at 501, the process can capture the behavior at 501 with a vehicle camera. An image of the behavior could be shown to the parent if appropriate, or be stored for later review. Since the parent will presumably have at least some sense of what just occurred, the process may simply indicate that the behavior was captured at 503 and ask the parent with a simply yes/no response if the behavior was bad/good/etc. in this manner, the parent can quickly confirm good/benign/and behavior, and the process can use this feedback for AI modeling to better improve the ability to automatically identify such behavior.

The parent may also quickly or alternatively select approve/disapprove/ignore (or other alternatives) with regards to observed behavior. For example, when volumes of voices within a vehicle reach certain decibels, when fast and large movements are detected, when bodies interact, etc., the process may log a behavior event and provide a quick-feedback window to the parent. The parent can use this window to select a response type, which in this example would include reinforcement of good behavior, gentle reminder not to engage in bad behavior, or an instruction to ignore all behavior for some period of time. Selection of ignoring behavior can set an ignore flag at 507 that persists for a defined time period (a number of minutes, the journey, several days, etc).

If there is a response to be delivered, the parent's role may end at this point if they prefer, and the vehicle 100 can take over by using the configuration for the child or a learning process to produce attempts at reinforcement or changing behavior. In this example, the vehicle 100 chooses a response based on stored responses (e.g., those for reinforcement or deterrence) at 509. For each child the approach may be different, and the examples shown are those designed for deterrence.

Some children respond well to requests at 511, and so the process may choose a request type response that asks the child to cease the behavior at 513. Other children may respond to changes in subject at 515, and so the response can tell a joke or play a short video clip designed to change the child's focus at 517. This can also include asking a random question, such as "do you see any birds outside?" Other children may require negotiation at 519, and the process can offer a reward for improved behavior at 521. The vehicle does not need to determine the "best" method of reinforcement from a child psychology perspective, it can work within parent-preferred parameters as to how those parents want to interact with their children and based on their own desires.

If there is no known preferred response, the vehicle 100 may attempt to learn what works best by trying different approaches at different times. The vehicle 100 can observe results in either event (planned or random approaches) at 523, at least by observing a noticeable change to behavior or cessation of the prior observed behavior. The vehicle 100 can also update a profile of a child at 525 to indicate which approaches work best for the child.

Parents can review the profiles as well, and determine if the "wrong" approach is being used too frequently. For example, parents may not want to bargain overmuch with their children, and so if the vehicle is frequently negotiating rewards for behavior, the parent may prohibit that approach for some time period to avoid having the child act out simply to gain a reward. Of course, parents may also be willing to accept the consequences of such bargaining in exchange for quiet in the vehicle, and may elect not to change the approach. The vehicle may also observe that excessive responses of one type are eliciting more frequent undesired behavior and change the approach based on that observation as well, to mitigate the impact of a single approach.

Figure 6:
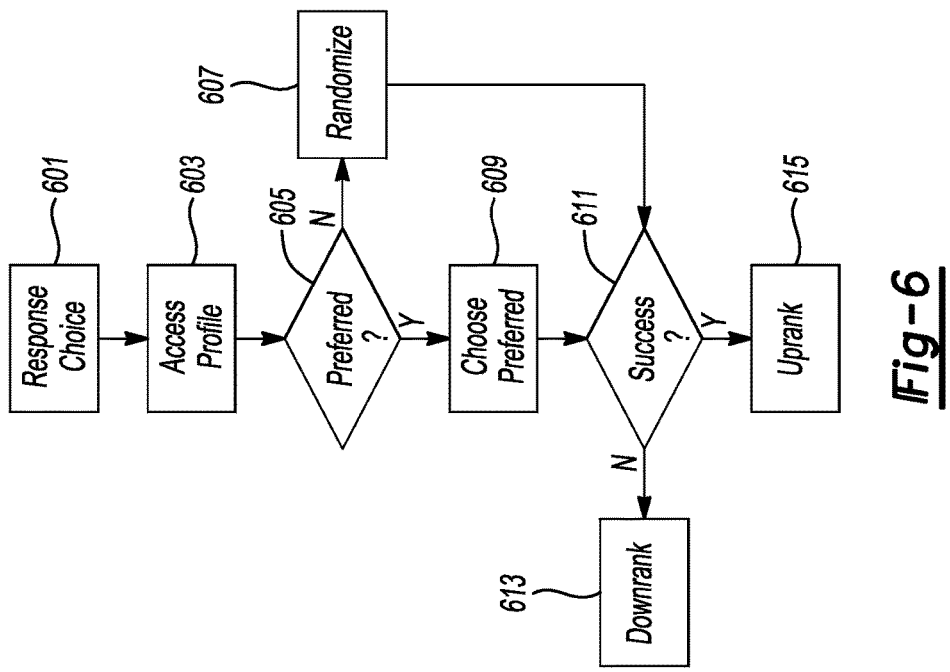
FIG. 6 shows an illustrative example of choosing a response to behavior.

FIG. 6 shows an illustrative example of choosing a response to behavior. In this example, the process determines that a response choice is needed at 601, based on behavior or a reminder being required. The process can access a child profile when available at 603 and determine if a preferred response type has been noted or designated at 605.

If a parent designates a response type, the process may not deviate from that response type unless the parent allows it, even if a different response type may be more effective, to respect the parenting goals of the parent. If there is a preferred response type based on learned behavior or permissibly choosable, the process can select this at 609. Otherwise the process may randomize the response type at 607 until a preferred strategy emerges.

If the response type chosen produces success at 611, the process can uprank the response type at 615, otherwise it can downrank the response type at 613.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   one or more processors configured to:
   determine an identity of an occupant for which a customized vehicle message is designated;
   determine the occurrence of a predefined situation with respect to the occupant;
   select the customized message from an occupant profile responsive to the occurrence of the predefined situation;
   select at least one vehicle output associated with a determined location of the occupant; and
   automatically output the customized message through the selected vehicle output.

2. The vehicle of claim 1, wherein the identity includes a specific identity of the occupant.

3. The vehicle of claim 1, wherein the predefined situation includes a reminder to engage a retention device.

4. The vehicle of claim 1, wherein the predefined situation includes a verbal reaction from the occupant having at least one predefined characteristic.

5. The vehicle of claim 1, wherein the predefined situation includes a physical action from the occupant having at least one predefined characteristic.

6. The vehicle of claim 1, wherein the customized message is correlated to one approach of a plurality of approaches saved with respect to the occupant profile, the one approach being determined, based on past observation, to be more successful, based on observed response to the approach, than at least one other approach at eliciting a desired response from the occupant.

7. The vehicle of claim 6, wherein the one or more processors are further configured to:
observe a response of the occupant to outputting the message; and
modify a relative ranking of the one approach relative to the other of the plurality of approaches based on whether the observed response corresponds to predefined desired behavior.

8. The vehicle of claim 1, wherein the customized message is selected from a sequence of messages based on an order predefined by an administrator of the vehicle.

9. The vehicle of claim 1, wherein the one or more processors are further configured to:
observe a response of the occupant to outputting the message; and
offer a reward to the occupant based on the response corresponding to predefined desired behavior.

10. A vehicle comprising:
one or more processors configured to:
receive a user-input correlation between a plurality of predefined messages and a plurality of predefined behavioral situations defining child behavior;
determine the presence of at least one child within the vehicle based on vehicle sensor data;
determine, based on vehicle systems, that one of the predefined behavioral situations is occurring with regards to the at least one child;
select, based on the user-input correlation, at least one message associated with the determined occurrence of the behavioral situation; and
automatically output the at least one message through a vehicle output.

11. The vehicle of claim 10, wherein the behavioral situations each have one or more vehicle-observable parameters associated therewith, defined as indicative of a respective behavior.

12. The vehicle of claim 11, wherein the one or more processors are further configured to:
determine, based on vehicle systems, whether a predefined desired outcome has resulted from automatic output of the at least one message.

13. The vehicle of claim 12, wherein the one or more processors are further configured to determine whether the predefined desired outcome has resulted based on observation of the at least one child, using the vehicle systems, following automatic output of the message and determining based on the observation whether the vehicle observable-parameters, associated with the determined predefined behavioral situation, have changed to states no longer indicative of the determined behavioral situation.

14. The vehicle of claim 12, wherein the one or more processors are further configured to:
automatically play a second message responsive to the desired outcome resulting.

15. The vehicle of claim 13, wherein the one or more processors are further configured to:
automatically play a third message responsive to the desired outcome not resulting.

16. The vehicle of claim 10, wherein the behavioral situations include vehicle reminders to engage a vehicle system and the parameters include whether or not the system has been engaged as discerned by a vehicle sensor.

17. The vehicle of claim 10, wherein the behavioral situations include loud verbal utterance and the parameters include a volume of verbal output as recorded by a vehicle microphone.

18. The vehicle of claim 10, wherein the behavioral situations include aggressive physical behavior and the parameters include a level of physical movement as observed by a vehicle camera.

19. The vehicle of claim 10, wherein the one or more processors are further configured to:
determine at least one output corresponding to a location of the at least one child; and
using the at least one output for outputting the at least one message.

20. A method comprising:
determining that a child is behaving in a manner correlated to a predefined behavioral state of a plurality of behavioral states, based on vehicle sensor data indicating behavioral actions of the child corresponding to predefined action parameters associated with a respective predefined behavioral state;
determining a predefined message designated for playback responsive to the determined predefined behavioral state;
outputting the predefined message, responsive to determining the predefined behavioral state, through an output associated with an observed location of the child within a vehicle;
determining a change to the behavioral actions of the child resulting in a loss of correspondence to the predefined action parameters associated with the determined behavioral state, responsive to output of the predefined message; and
outputting a second predefined message designated for playback responsive to a change in behavioral actions of the child resulting in the loss of correspondence.

* * * * *